United States Patent
Hanebutte et al.

(10) Patent No.: US 7,594,073 B2
(45) Date of Patent: Sep. 22, 2009

(54) METHOD AND APPARATUS FOR CACHING MEMORY CONTENT ON A COMPUTING SYSTEM TO FACILITATE INSTANT-ON RESUMING FROM A HIBERNATION STATE

(75) Inventors: Ulf R. Hanebutte, Gig Harbor, WA (US); Ram Chary, Portland, OR (US); Pradeep Sebastian, Beaverton, OR (US); Shubha Kumbadakone, Hillsboro, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/541,113

(22) Filed: Sep. 29, 2006

(65) Prior Publication Data

US 2008/0082743 A1    Apr. 3, 2008

(51) Int. Cl.
G06F 12/00   (2006.01)
G06F 13/00   (2006.01)
G06F 13/28   (2006.01)
G06F 1/26    (2006.01)
G06F 1/32    (2006.01)
G06G 1/00    (2006.01)

(52) U.S. Cl. .................. 711/113; 711/154; 711/170; 713/320; 713/323

(58) Field of Classification Search .................. 711/113
See application file for complete search history.

(56) References Cited

U.S. PATENT DOCUMENTS

| 5,519,831 | A  | * | 5/1996  | Holzhammer ................. 714/22 |
| 5,551,002 | A  | * | 8/1996  | Rosich et al. ................ 711/134 |
| 6,347,370 | B1 | * | 2/2002  | Grimsrud ........................ 713/1 |
| 6,901,298 | B1 | * | 5/2005  | Govindaraj et al. ........... 700/21 |
| 6,968,450 | B1 | * | 11/2005 | Rothberg et al. ................ 713/1 |
| 2004/0003223 | A1 | * | 1/2004 | Fortin et al. ..................... 713/1 |
| 2006/0053325 | A1 | | 3/2006 | Chary et al. |

OTHER PUBLICATIONS

Andrew Tanenbaum. Structured Computer Organization. 1984. Prentice Hall Inc. pp. 10-12.*
Intel Microsoft Toshiba. Advanced Configuration and Power Interface Specification. 1999. Intel Corporation, Microsoft Corporation, Toshiba Corp.*

* cited by examiner

*Primary Examiner*—Ryan Bertram
(74) *Attorney, Agent, or Firm*—Blakely, Sokoloff, Taylor & Zafman LLP

(57) ABSTRACT

The memory content may be cached in the non-volatile cache when a computing system is entering S4 state. The non-volatile cache may be coupled to a bus that connects the disk drive with the disk controller. When resuming from S4 state, the memory content may be read from the non-volatile cache rather than from the slow disk drive, which facilitates instant-on resuming for the system. The caching process may be performed in an OS-transparent manner. During the caching process, data with contiguous addresses may be merged into a block of data. A mapping table may be created and stored in the non-volatile cache which includes multiple entries, each for a block of data. The mapping table facilitates data reading from the non-volatile cache to provide instant-on resuming from S4 state.

25 Claims, 7 Drawing Sheets

500

| ENTRY INDEX | LOGICAL BLOCK ADDRESS (LBA) ON HDD | NUMBER OF SECTORS | MAPPED ADDRESS ON NV CACHE | ADDITIONAL INFORMATION |
|---|---|---|---|---|
| 0 | A | X | A' | |
| 1 | B | Y | B' | |
| 2 | C | Z | C' | |
| ......... | ......... | ......... | ......... | |

| | |
|---|---|
| 702: | $first_entry=1 |
| 704: | while (OS is sending Hibernate SRB's) { |
| 706: |     extract logical base address from SRB that is targeted for disk and store in $LBA |
| 708: |     extract sector count from SRB that is targeted for disk and store in $CNT |
| 710: |     if($first_entry==1) { |
| 712: |         #create first table entry |
| 714: |         $first_entry=0; |
| 716: |         $entry=1; |
| 718: |         @LBA_disk[$entry]=$LBA; |
| 720: |         @SectorCount[$entry]=$CNT; |
| 722: |         $LBA_C = $StartAddressCache; |
| 724: |         @LBA_cache[$entry]=$LBA_C; |
| 726: |         $CNT_previous = $CNT; |
| 728: |         Create and write cache SRB to cache device ($LBA_C, $CNT) |
| 730: |         Write original SRB to disk; |
| |     } |
| 732: |     else { |
| 734: |         #check if contiguous, if so just append |
| 736: |         if ($LBA == (@LBA_disk[$entry]+@SectorCount[$entry]) ) { |
| 738: |             #contiguous |
| 740: |             @SectorCount[$entry]+=$CNT; |
| 742: |             $LBA_C =@LBA_cache[$entry]+$CNT_previous; |
| 742: |             $CNT_previous +=$CNT; |
| 744: |             Create and write cache SRB to cache device ($LBA_C, $CNT) |
| 746: |             Write original SRB to disk; |
| |         } |
| 748: |         else { |
| 750: |             #close table entry and start new entry |
| 752: |             $entry++; |
| 754: |             @ LBA_disk[$entry]=$LBA; |
| 756: |             @SectorCount[$entry]=$CNT; |
| 758: |             $LBA_C = @LBA_cache[$entry-1]+ @SectorCount[$entry-1]; |
| 760: |             @LBA_cache[$entry]=$LBA_C; |
| 762: |             $CNT_previous =$CNT; |
| 764: |             Create and write cache SRB to cache device ($LBA_C, $CNT) |
| 768: |             Write original SRB to disk; |
| |         } |
| |     } |
| | } |

FIG. 7

METHOD AND APPARATUS FOR CACHING MEMORY CONTENT ON A COMPUTING SYSTEM TO FACILITATE INSTANT-ON RESUMING FROM A HIBERNATION STATE

RELATED APPLICATION

This application is related to commonly assigned U.S. application Ser. No. 11/541,224, concurrently filed by Ram Chary and Pradeep Sebastian and entitled "Configuring a Device for Operation on a Computing Platform," and is related to commonly assigned U.S. application Ser. No. 11/541,113, concurrently filed by Ram Chary, Shreekant S. Thakkar, Ulf R. Hanebufte, Pradeep Sebastian, and Shubha Kumbadakone and entitled "Method and Apparatus for Saving Power for a Computing System by Providing Instant-On Resuming from a Hibernation State."

BACKGROUND

1. Field

This disclosure relates generally to power consumption reduction in a computer system, and more specifically but not exclusively, to methods and apparatus for caching memory content to facilitate instant-on resuming from a hibernation state for low power computing platforms.

2. Description

Ultra mobility is becoming a trend for today's personal computers (PCs). Users expect many PCs, especially laptop PCs, to have all-day battery life and quick responding capability. To extend battery life, a PC needs to be aggressively put into low power idle states, much more aggressively than most PCs currently are. Today most PCs use Advanced Configuration and Power Interface (ACPI) to manage their power consumption. The ACPI enables an operating system (OS) to control the amount of power consumed by a PC. With the ACPI, the OS can put a PC into the S4 (hibernate) state or the S3 (sleep) state when the PC is not active for a certain period of time. A PC consumes much more power under the S3 state than under the S4 states. Thus, to extend battery life and hence to become more mobile, it is desirable to put a PC into the S4 state over long periods of inactivity. However, while the S4 state is ideal for conserving power, it is a high-latency sleep state since the system context is saved to (and read back on resume from) the hard disk drive (HDD). Given that the hand-top PCs normally need to use micro-drives (to achieve the form-factor & cost targets), this results in resume times varying widely from 3-4 seconds (S3 resume) to 30 plus seconds (S4 resume using micro-drives). In other words, while the S4 state conserves more power than the S3 state, it slows down a PC's responding time during wakeup, which becomes less acceptable in today's fast-pace computing environment. Thus, it is desirable to reduce S4 resume time.

BRIEF DESCRIPTION OF THE DRAWINGS

The features and advantages of the disclosed subject matter will become apparent from the following detailed description of the subject matter in which:

FIG. 5 illustrates an example mapping table stored/read from a non-volatile cache when a computing system enters/resumes from a hibernation state;

FIG. 7 is pseudo code illustrating an example process for caching memory content to a non-volatile cache before power for the memory is turned off when a computing system is entering a hibernation state.

DETAILED DESCRIPTION

According to embodiments of the subject matter disclosed in this application, a computing system may conserve most power by entering the S4 state (rather than the S3 state) over long periods of inactivity and also be able to resume from the S4 state rapidly to provide a quick response. Rather than storing hibernate data in the HDD, a non-volatile cache may be used to cache the hibernate data when the system enters the S4 state. The non-volatile cache may be made of flash memory and may be coupled to a bus that connects the HDD with the disk controller. When resuming from the S4 state, the hibernate data may be read from the non-volatile cache and hence resume time may be reduced because access latency to the non-volatile cache is much shorter than to the HDD. The caching process may be performed in an OS-transparent manner. During the caching process, data with contiguous addresses may be merged into a block of data. A mapping table may be created and stored in the non-volatile cache which includes multiple entries, each for a block of data. The mapping table facilitates data reading from the non-volatile cache to provide instant-on resuming from S4 state.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
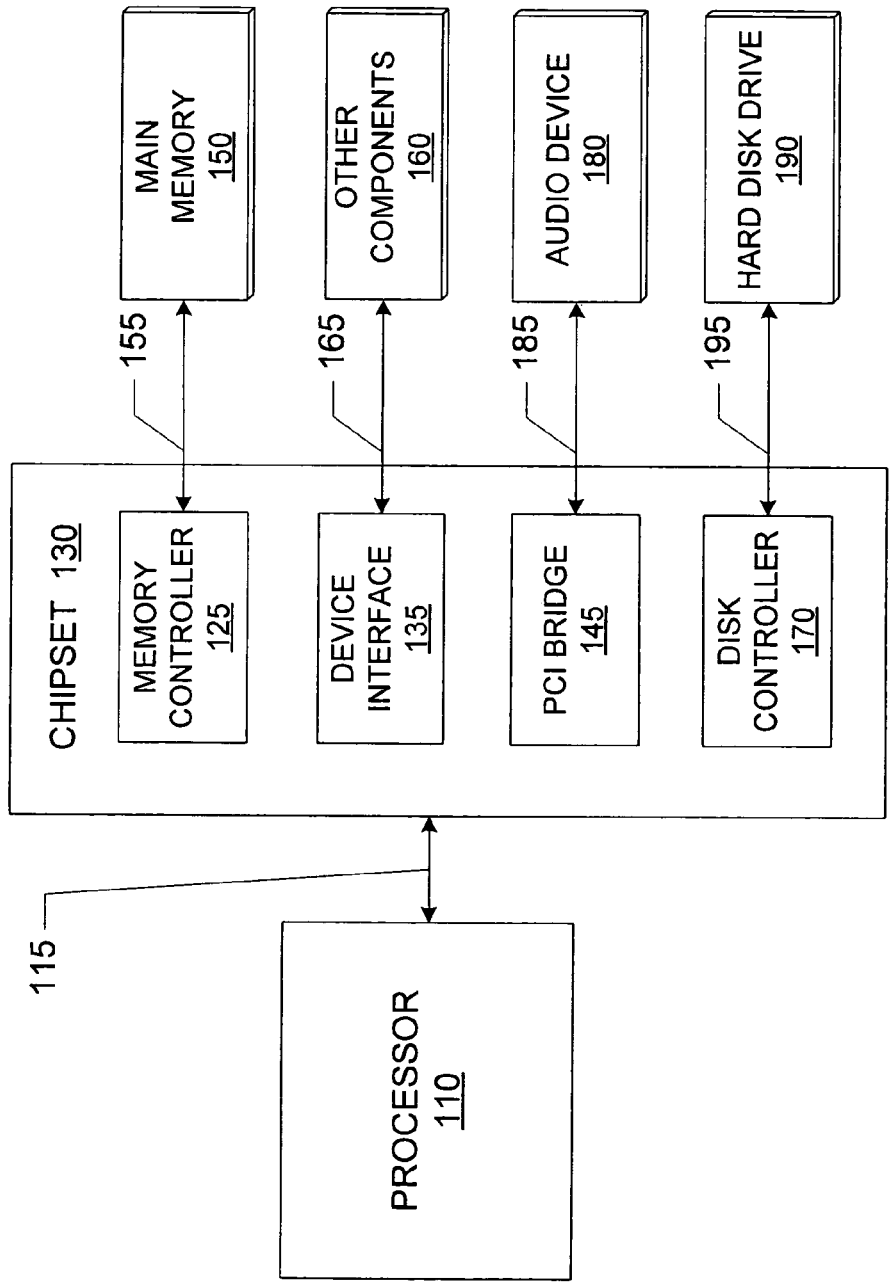
FIG. 1 shows one example computing system where the ACPI may be used for power management and the hibernation resume time may be reduced.

FIG. 1 shows one example computing system 100 where the ACPI may be used for power management and the S4 resume time may be reduced. Computing system 100 may comprise one or more processors 110 coupled to a system interconnect 115. Processor 110 may have multiple or many processing cores (for brevity of description, term "multiple cores" will be used hereinafter to include both multiple processing cores and many processing cores). The computing system 100 may also include a chipset 130 coupled to the system interconnect 115. Chipset 130 may include one or more integrated circuit packages or chips. Chipset 130 may comprise one or more device interfaces 135 to support data transfers to and/or from other components 160 of the computing system 100 such as, for example, keyboards, mice, network interfaces, etc. The device interface 135 may be coupled with other components 160 through a bus 165. Chipset 130 may be coupled to a Peripheral Component Interconnect (PCI) bus 185. Chipset 130 may include a PCI bridge 145 that provides an interface to the PCI bus 185. The PCI Bridge 145 may provide a data path between the processor 110 as well as other components 160, and peripheral devices such as, for example, an audio device 180. Although not shown, other devices may also be coupled to the PCI bus 185.

Additionally, chipset 130 may comprise a memory controller 125 that is coupled to a main memory 150 through a memory bus 155. The main memory 150 may store data and sequences of instructions that are executed by multiple cores of the processor 110 or any other device included in the system. The memory controller 125 may access the main memory 150 in response to memory transactions associated with multiple cores of the processor 110, and other devices in the computing system 100. In one embodiment, memory controller 125 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Moreover, chipset 130 may include a disk controller 170 coupled to a hard disk drive (HDD) 190 (or other disk drives not shown in the figure) through a bus 195. The disk controller allows processor 110 to communicate with the HDD 190. In some embodiments, disk controller 170 may be integrated into a disk drive (e.g., HDD 190). There may be different types of buses coupling disk controller 170 and HDD 190, for example, the advanced technology attachment (ATA) bus and PCI Express (PCI-E) bus.

An OS (not shown in the figure) may run in processor 110 to control the operations of the computing system 100. The OS may use the ACPI for managing power consumption by different components in the system. Under the ACPI, there are 4 sleep states S1 through S4. The time needed to bring the system back into normal wakeup working state (wake-latency time) is shortest for S1, short for S2 and S3, and not so short for S4. S1 is the most power-hungry of sleep modes with processor(s) and Random Access Memory (RAM) powered on. S2 is a deeper sleep state than S1, where the processor is powered off. The most common sleep states are S3 and S4. In S3 state, main memory (RAM) 150 is still powered and the user can quickly resume work exactly where he/she left off—the main memory content when the computer comes back from S3 is the same as when it was put into S3. S4 is the hibernation state, under which content of main memory 150 is saved to HDD 190, preserving the state of the operating system, all applications, open documents etc. The system may be put into either S3 (sleep) state or S4 (hibernation) state manually or automatically after a certain period of inactivity.

Figure 2A:
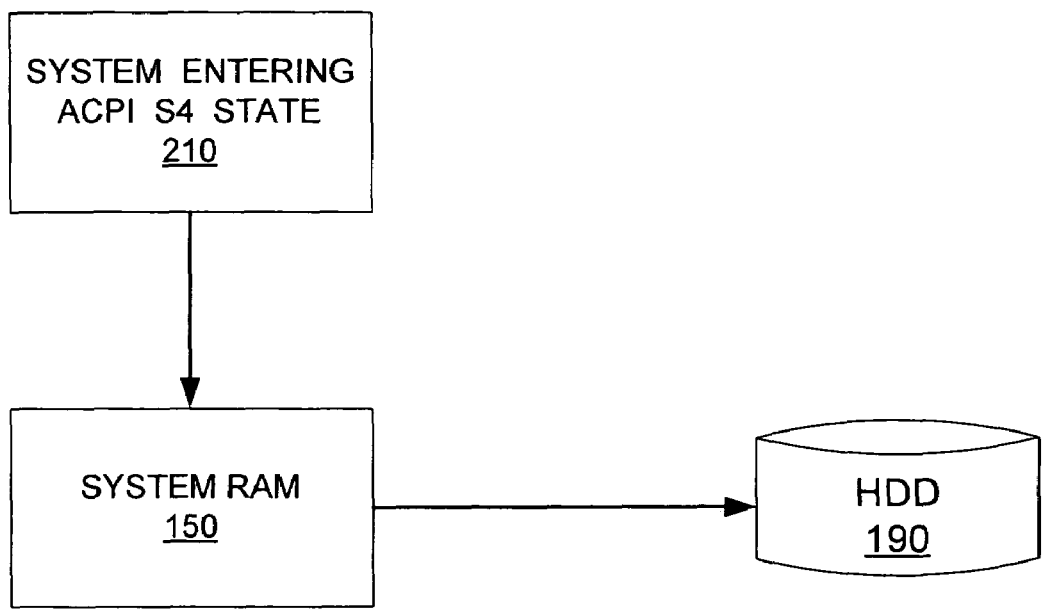
FIGS. 2A and 2B illustrate how hibernate data is stored when a computing system enters a hibernation state and how the hibernate is read when the system resumes from the hibernation state.

FIGS. 2A illustrates the process of caching the main memory content to a hard drive when computing system 100 in FIG. 1 enters S4 state. When the system 100 enters into S4 state at block 210, the OS directs that a memory image (also called hibernate data or hiberfile) for memory 150 be generated. Once the memory image is generated, it is written to HDD 190. FIGS. 2A illustrates the process for system 100 to resume from S4 state. When system 100 resumes from S4 state, the OS directs that all data necessary for the system to return where it left off be read from HDD 190 to memory 150. When resuming from S4 state, the sequence of memory data to be read may be different from the sequence of data cached to the HDD when the system enters S4 state.

Since the main memory is not powered on in S4 state, a system can save more power in S4 state than in S3 state. However, the resume time is much longer from S4 state than from S3 state since the main memory content needs to be read from a hard drive. When a micro-drive is used, the resume time from S4 state can even be longer than the resume time with a typical HDD. For an ultra mobile PC, it is desirable to have the instant-on resuming capability while still saving as much power as possible (and thus extend battery life). Therefore, it is desirable to reduce the resume time from S4 state for an ultra mobile PC. According to one embodiment of the subject matter disclosed in this application, a non-volatile cache (NV cache) may be used to cache the main memory content. For example, a NV cache (not shown in FIG. 1) may be added and coupled to disk controller 170 to cache content in memory 150 when system 100 enters S4 state. When system 100 wakes up from S4 state, the cached memory content may be read from the NV cache. Because access latency to the NV cache is much shorter than access latency to HDD 150, system 100 may achieve the instant-on goal when resuming from S4 state with the NV cache.

Figure 2B:
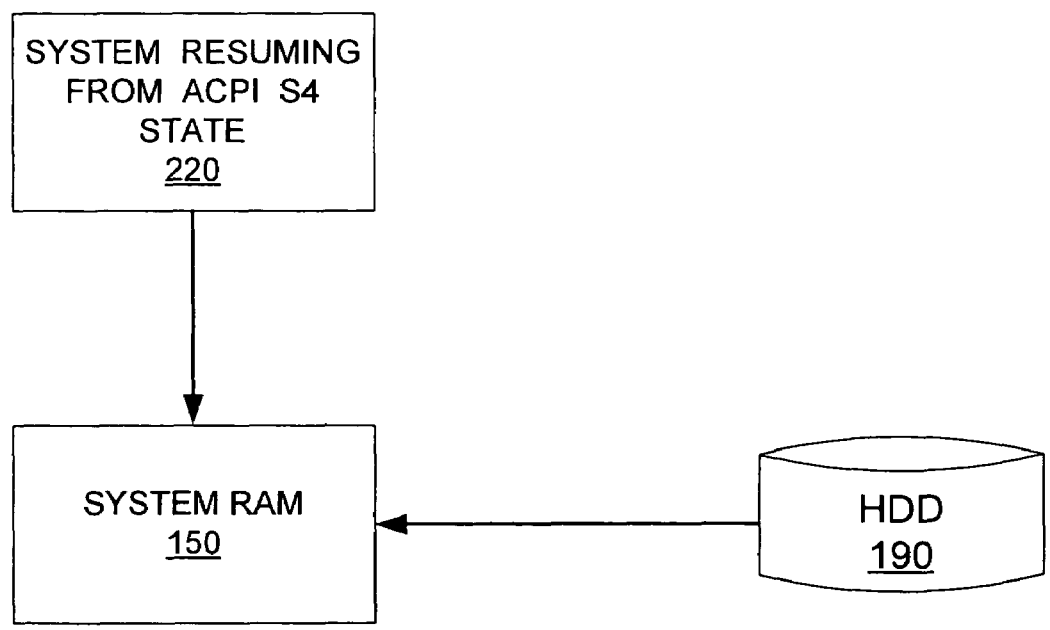
Figure 3A:
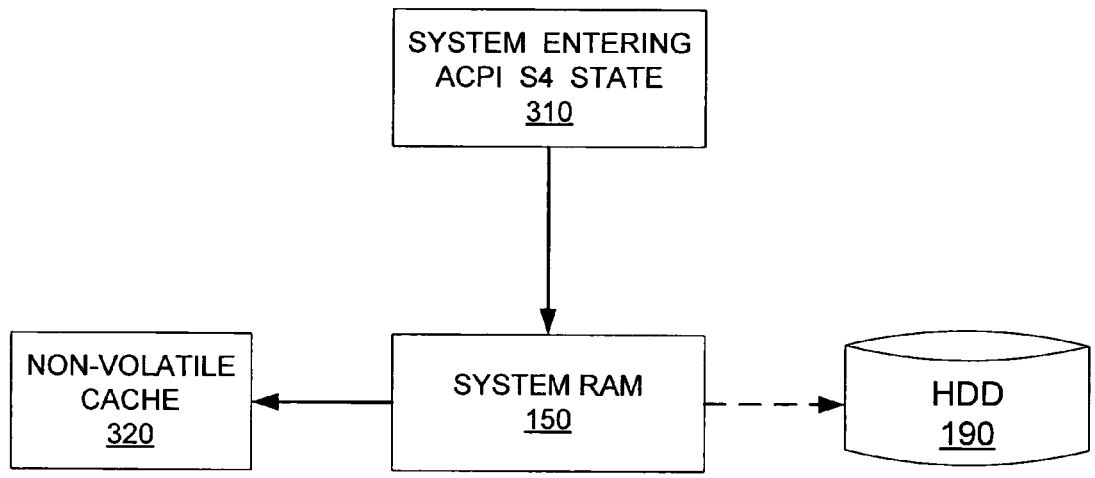
FIGS. 3A and 3B illustrate how hibernate data is stored when a PC enters a hibernation state and how the hibernate data is read when the PC resumes from the hibernation state, using a non-volatile cache.
Figure 3B:
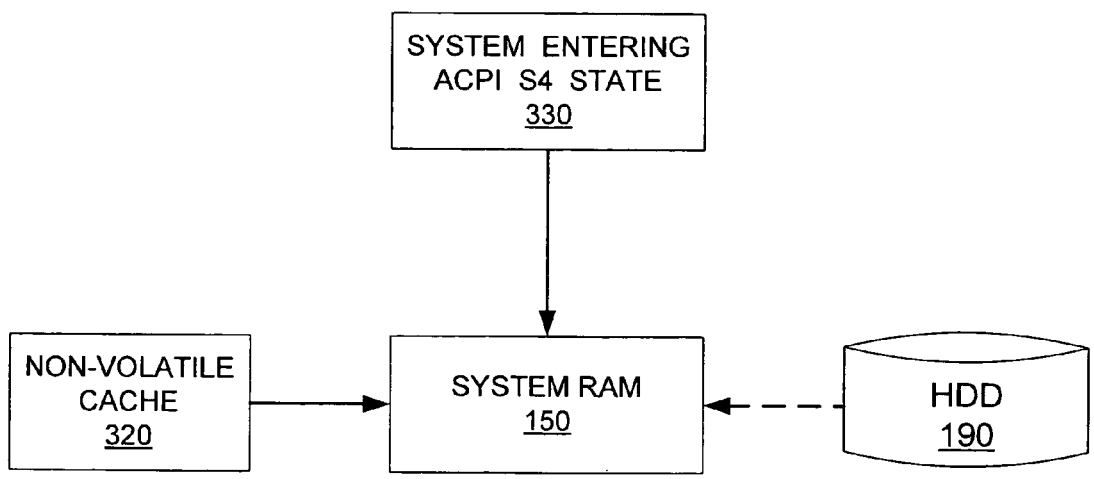

FIGS. 3A and 3B illustrate how memory content is stored when system 100 in FIG. 1 enters the S4 state and how the memory content is read when the system resumes from the S4 state, using a NV cache, as compared with FIGS. 2A and 2B, respectively, where no NV cache is used. In FIG. 3A, when system 100 enters S4 state at block 310, the OS directs that an image data for memory 150 be generated and written to HDD 190. However, requests to write the memory image to HDD are intercepted and the memory image is directed to NV cache 320. In FIG. 3B, when system 100 resumes from S4 state at block 330, the OS requests that the cached memory data be read back to memory 150 from HDD 190. However, the read requests may be intercepted and the cached memory data may actually be read from the NV cache 320.

Figure 4:
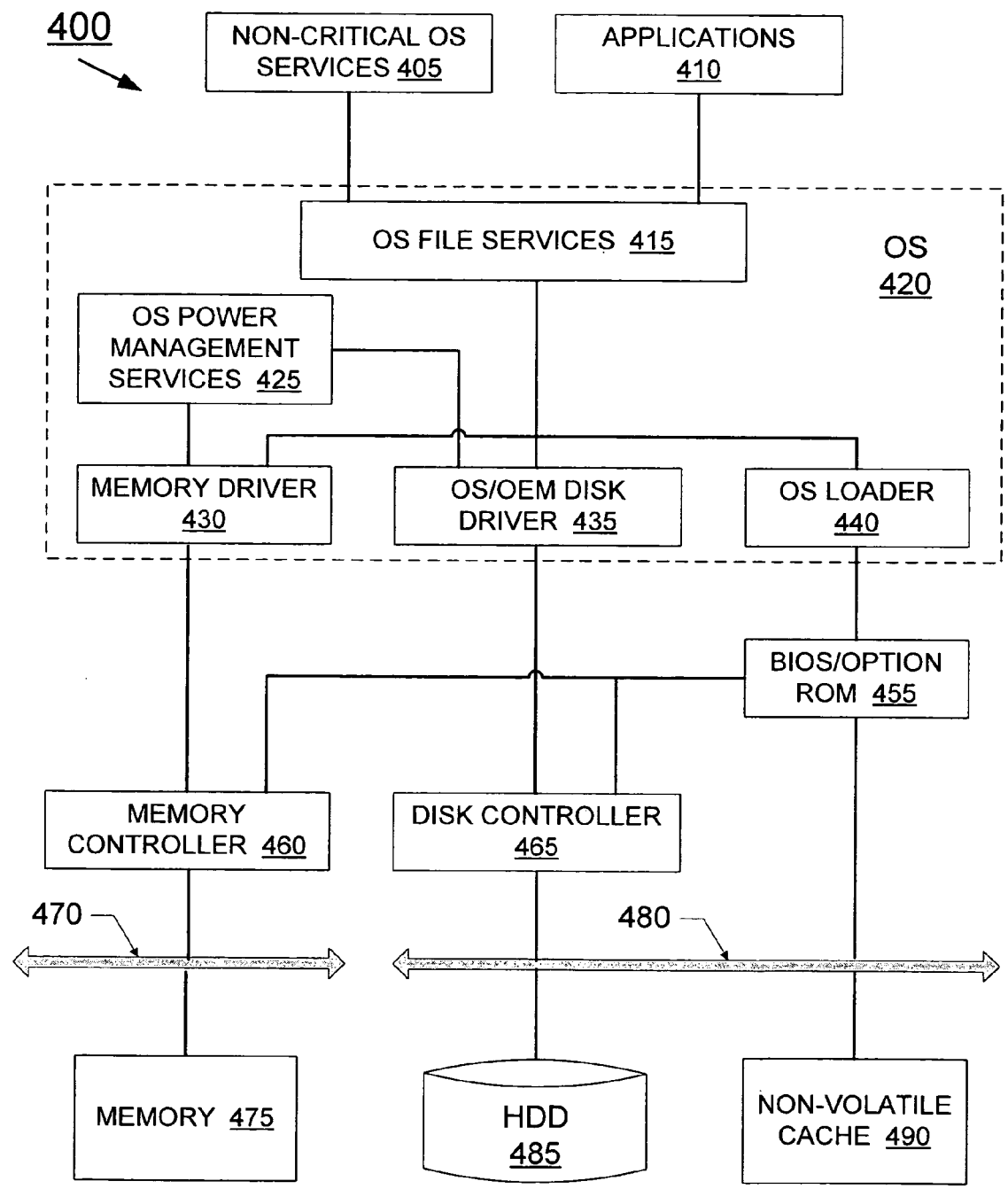
FIG. 4 shows a block diagram of a computing system where a non-volatile cache may be used to store/read from the hibernate data when the system enters/resumes from a hibernation state.

FIG. 4 shows a block diagram of a computing system 400 where a non-volatile cache may be used to cache the hibernate data when the system enters S4 state and to read from the hibernate data when the system resumes from the S4 state. System 400 may comprise an application layer, an OS layer, a controller layer, and a hardware layer. The application layer may include non-critical OS services 405 (e.g., data backup) and applications 410 (e.g., MP3 player). The OS layer mainly includes an OS 320 which may comprise several components such as OS file services 415, OS power management services 425, memory driver 430, an OS/OEM (Original Equipment Manufacturer) disk driver 435, and an OS loader 440. The controller layer may comprise a memory controller 460 and a disk controller 465. The hardware layer may include a memory 475, an HDD 485, and an NV cache 490, as well as memory bus 470 and disk bus 480. There may also be a firmware layer which may include basic I/O system (BIOS) and Option ROM 455. Note that these layers are used for the convenience of description and dividing lines between layers may vary.

OS file services 415 provide services to non-critical OS services 405 and applications. For example, OS file services 405 handle non-critical writes for non-critical OS services 405; and facilitate data prefetches for periodic applications. Components in the application lawyer such as non-critical OS services 405 and applications 410 do not directly deal with components in the controller layer and the hardware layer, but through OS components. For example, an application reads from or writes to memory 475 through memory driver 430; and reads from or writes to HDD 485 through OS/OEM disk driver. OS power management services 425 may use the ACPI to manage power consumption by different components in system 400. For example, when the OS puts the system into S4 hibernation state, power management services 425 request that an image file be generated for content in memory 475, and the image file be written to HDD 485. After completing writing the image file to the HDD, the power management services 425 turn off power of memory 475 and other hardware components in the hardware layer. OS power management services 425 communicate with the memory and the HDD through the memory driver and the OS/OEM disk driver, respectively.

Memory driver 430 and OS/OEM disk driver 435 serve as interfaces between the OS and the controller layer, and facilitate any communication between the OS and memory 475 and HDD 485, respectively. When booting or resuming from a hibernation state, the BIOS boot service loads the first 512 bytes of the storage media. The first 512 bytes usually will include the OS first level boot loader that loads the OS second level loader (shown as OS loader 440 in FIG. 4). The OS second level loader (440) will decide if the system has to be resumed from S4 or booted from S5 (ACPI OFF state). The OS second level loader works with BIOS/Option Rom 455 to decide what needs to be run before a system can be up and running or before a system can return what it left off when it resumes from S4 state.

Memory controller 460 and disk controller 465 serve as hardware side interfaces to the OS for memory 475 and HDD 485, respectively. The memory controller and the disk controller are typically located within a chipset. In some computing systems, however, there might not be a chipset and the hardware side memory and disk controllers may reside within relevant chips that communicate between the OS and memory and HDD using appropriate software drivers. BIOS/Option ROM 455 helps determine what a system can do before the OS is up and running. The BIOS includes firmware codes required to control basic peripherals such as keyboard, mouse, display screen, disk drive, serial communications, etc. The BIOS is typically standardized, especially for PCs. To customize some functions controlled by the BIOS, Option ROM may be used, which may be considered as an extension of BIOS to support OEM (Original Equipment Manufacturer) specific proprietary functionalities. When a system is booting up or resuming from S4 state, the BIOS calls code stored in the Option ROM. Thus, if a user desires a system to boot up differently from a standard booting process, the user may write his/her own booting code and store it in the Option ROM. The Option Rom may also include proprietary code to access memory controller 460 and disk controller 465.

According to one embodiment of the subject matter disclosed in this application, an NV cache 490 may be added to system 400. The NV cache may be coupled to disk bus 480 and be used to cache memory content when the system enters S4 state. The NV cache may be made of flash memory. When the system resumes from S4 state, the memory content (or hiberfile) can be restored from the NV cache rather than the HDD. Because the access latency to the NV cache is much shorter than the access latency to the HDD, restoring the memory content from the NV cache can significantly reduce the resuming time and thus provide instant-on or near instant-on experience for the user. Additionally, the NV cache may also be used as a disk cache in a normal wakeup working state. As a disk cache, the NV cache may help improve system I/O performance and reduce average system power consumption since the disk can be spun down for longer periods of time. Moreover, the subject matter disclosed herein may be extended to utilize the NV cache (such as flash memory) as a fast storage device for OS and applications combined with a slower storage device for data.

In one embodiment, caching and restoring the memory content using the NV cache may be performed entirely by the OS. In another embodiment, this can be done in an OS transparent manner. For example, caching the memory content in the NV cache may be done by the storage driver (e.g., OS/OEM disk driver 435); and restoring the memory content from the NV cache may be done by code in the Option ROM. Although OS/OEM disk driver 435 is shown in FIG. 4 as part of the OS, this driver may be replaced with OEM's own driver without interfering with any OS functionality$_{[URH1]}$. When caching and restoring the memory content using the NV cache is performed in an OS transparent manner, the NV cache may need to be placed on certain type of bus. For example, the OS may only write the hiberfile to a boot-drive which is typically on a specific bus (e.g., ATA bus). Also the OS may shut off secondary buses (e.g., PCI-E bus) prior to the stage when it caches the hiberfile. With the NV cache, a system may save considerable power by entering S4 states over long periods of inactivity while still having close to "instant on" capability desired for an ultra mobile computer.

FIG. 5 illustrates an example mapping table 500, which is created during the caching process and is stored/read from a non-volatile cache when a computing system enters/resumes from S4 state. The mapping table may be crated by the storage driver (e.g., disk driver and/or non-volatile cache driver) to correlate the cached data to the original data which is expected to be written to the disk drive. Hence, in some sense, the mapping table helps to hide the non-volatile cache from the OS. When a system is entering S4 state, the OS is writing a compressed memory image from volatile memory onto a non-volatile storage device (typically a hard disk drive) in order to preserve memory content. Without being known by the OS, writes of the compressed memory image may be diverted to the non-volatile cache by the storage driver. When the system resumes from S4 state, the OS requests the cached memory image be read back to main memory from the non-volatile storage device. Again without being known by the OS, codes in the Option ROM may read the memory image from the non-volatile cache. Because to the OS, the memory image is stored in and read from the non-volatile storage device but in reality, it is stored in and read from the NV cache, it is desirable to have a table that maps data addresses in HDD, which are known by the OS, to their corresponding addresses in the NV cache.

Logical block addressing (LBA) is a common scheme used for specifying the location of blocks of data stored on computer storage devices, generally secondary storage systems such as hard disks. The term LBA can mean either the address or the block to which it refers. Since LBA was first developed around SCSI (Small Computer System Interface) drives, LBA is often mentioned along with SCSI Request Block (SRB). Under the LBA scheme, blocks on disk are simply located by an index, with the first block being LBA=0, the second LBA=1, and so on. Most modern computers, especially PCs, support the LBA scheme. When an OS sends a data request (either a write or a read request) to HDD, the request typically includes LBA—the logical start address of the data block on the HDD, and the sector count—size of the data block on the disk. Typically in storage disk terms, a sector is also considered a logical block. For convenience of description, a data block is considered as a sequence of contiguous sectors in this application.

Turning back to FIG. 5, mapping table 500 illustrated therein comprises at least three columns: 510, 520, and 530. Column 510 includes LBAs of blocks on HDD ("disk LBAs") and column 530 includes mapped addresses on the NV cache for the LBAs shown in column 510 ("cache LBAs"). Column 520 includes number of sectors (or size of blocks with LBAs on HDD shown in column 510). Column 540 shows some additional information which may be included in mapping table 500. Note that there may be multiple additional columns included in the table for other information. Mapping table 500 also includes a few examples showing the relationship between a LBA in column 510, its corresponding block size in column 520, and the LBA's mapped address on the NV cache in column 530. For example, block 1's disk LBA may be A; block 1 has X number of sectors; and its cache LBA is A'. A row in the mapping table is an entry and entries in the mapping table may be sorted by either disk LBAs, cache LBAs or size of data (i.e., number of sectors). Entries in the mapping table may be indexed (as illustrated in table 500) for ease of search. The mapping table is constructed when the system is entering S4 state (before power to main memory is turned off).

Figure 6:
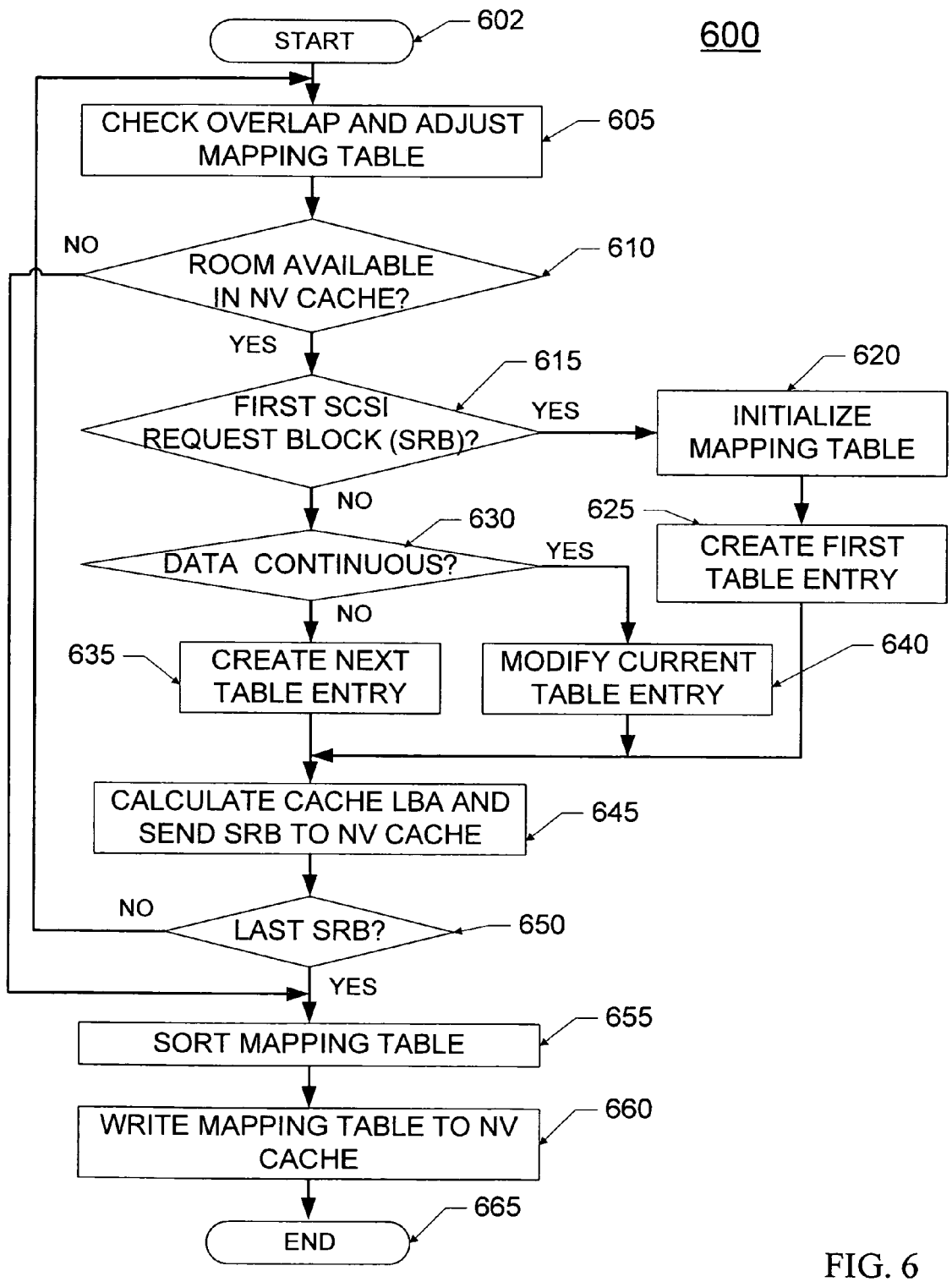
FIG. 6 is a flowchart of an example process for caching memory content to a non-volatile cache before power for the memory is turned off when a computing system is entering a hibernation state.

FIG. 6 is a flowchart of an example process 600 for caching memory content to a non-volatile cache before power for the memory is turned off when the system is entering a sleep state. A mapping table is created during the caching process and is stored in the NV cache at the end of the caching process. Generally, when a system is entering a hibernation state, process 600 identifies contiguous data blocks and creates one entry in the mapping table for these larger data blocks, rather than one entry for each individual SRB. Data for sequential blocks will be sequential on the NV cache, which is not necessarily true for data on a disk drive. Writes to the NV cache are in the form of an SRB, which include metadata and actual data that is to be read from or written to the NV cache. Among other information, metadata includes the disk LBA of the actual data block, the size of the data block in sectors, and the cache LBA of the actual data block. Additionally, data is written to the NV cache as well as the non-volatile storage device (i.e. the original storage disk, which the OS expects to contain the hiberfile). This write through caching strategy does not represent a performance penalty, since both devices may be served at the same time and the writing of the data may be carried out in parallel.

Process 600 starts at block 602 with receiving an SRB. At block 605, the received SRB is checked against the mapping table if there is any (for the first SRB there is no mapping table created yet). When a system is entering a hibernation state, it is possible that the OS may write to an HDD sector more than once. In such a case, it is desirable to avoid one HDD sector from having more than one entry in the mapping table corresponding to it. Block 605 checks for such overlapped writes. If it is found that the SRB overlaps with an existing entry in the mapping table, a new entry will be created for the block of data included in the SRB and that existing entry will be modified. For example, if the data block in the SRB ("SRB data") overlaps with the entire data block representing by the existing entry, that entry may be simply invalidated (in one embodiment, that entry may also be removed from the mapping table). If the SRB data overlaps with only a portion of the data block represented by an existing entry, that existing entry may be modified. Specifically, if the SRB data overlaps with the first/last portion of the data block represented by the existing entry, the entry's disk LBA, size of data block, and cache LBA may be modified. If the SRB data overlaps with the middle portion of the data block represented by the existing entry, that entry may be split into two or more entries with each having its new parameters (e.g., disk LBA, data size, and cache LBA).

At block 610, it may be checked whether there is enough space available on the NV cache for the received SRB. If not, the process will stop caching data; sort the mapping table (if there is one being created) by the LBAs of blocks on the disk drive at block 655; and end at block 665. All other data will be written to disk. If there is enough space available on the NV cache, block 615 may determine whether the current write is the first SRB. If it is, a mapping table is initialized at block 620; and the first entry may be created in the mapping table at block 625. The initialization of the mapping table may include allocating space and create data structure for the mapping table. The first table entry will include the disk LBA of the data block, the size of the data block in sectors, and the cache LBA.

If the current SRB is not the first one, block 630 checks whether the current SRB and the block of data represented by the current table entry are sequential. If they are, the current table entry may be modified at block 640. The modification is mainly for the size of the data block with the new size being the current size plus the size of the new data block, although other items in the entry (e.g., the disk LBA) may also be modified. This basically merges the new data block with the data in the current table entry to form a larger data block. If the current SRB and the block in the current entry are sequential but the current SRB precedes the block in the current entry, it may be desirable to create a next entry for the current SRB if the speed of caching is a concern (moving the block in the current entry to a different address in the NV cache takes some time). If the current SRB and the block in the current entry are not sequential, a next entry may be created in the mapping table to represent the current SRB with the disk LBA and data size being the disk LBA and the data size of the current SRB's, respectively, and a cache LBA.

At block 645, a cache LBA for a new entry in the mapping table may be calculated. For the first table entry, the cache LBA equals to the start address of the NV cache. For the second entry, the cache LBA equals to the cache LBA of the first entry plus the size of the first entry in sectors. For entry N, the cache LBA equals the cache LBA of entry (N−1) plus the size of entry (N−1). Also at block 645, the current SRB may be sent to the NV cache after its cache LBA is calculated. Block 650 checks whether the current SRB is the last one. If not, the process will go back to block 605 and restart from there. If it is, creation of the mapping table is completed and the mapping table may be sorted by disk LBAs for all entries in either a decent or ascent order. At block 660, the mapping table may be written to the NV cache from the memory. Note that there is space reserved for the mapping table on the NV cache. Process 600 may end at block 665.

FIG. 7 is pseudo code 700 illustrating an example process for caching memory content to a non-volatile cache before power for the memory is turned off when a computing system is entering a hibernation state. In the pseudo code, $ is used to denote a variable; @ is used to denote a vector. The mapping table contains rows (entries) which are indexed by $entry, starting with 1. Each row of the mapping table contains 3 values: LBA_disk (disk LBA), LBA_cache (cache LBA) and SectorCount (block size in sectors). Pseudo code 700 illustrates a process similar to the process 600 shown in FIG. 6 and is self-explaining.

Although an example embodiment of the disclosed subject matter is described with reference to block and flow diagrams in FIGS. 1-9, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for a computing system to transition to a low power state, comprising:
   receiving a request to write memory content to a non-volatile storage device for the transition to the low power state;
   generating an image for the memory content;
   sending the memory image to the non-volatile storage device in at least one write ("disk write"), each write including a block of data, size of the block of data, and logical block address (LBA) of the block of data on the non-volatile storage device ("disk LBA");
   intercepting the disk write;
   directing the disk write to a non-volatile cache;
   writing the block of data included in the disk write to the non-volatile cache, including
      determining that the block of data included in the disk write is contiguous with data included in a disk write for the transition to the low power state that immediately precedes the disk write ("previous disk write"), wherein the data included in the previous disk write corresponds to an already existing entry of a mapping table correlating data in the non-volatile cache to data to be written to the non-volatile storage device, and
      in response to the determining,
         merging the block of data with the data in the previous disk write to form a larger block of data on the non-volatile cache, and
         modifying the already existing entry of the mapping table to describe a size of the larger block of data.

2. The method of claim 1, wherein the low power state comprises a hibernation state, the hibernation state including an S4 state under the Advanced Configuration and Power Interface (ACPI) specification.

3. The method of claim 1, wherein the non-volatile storage device comprises a secondary storage device, the secondary storage device including a hard disk drive; and the non-volatile cache comprises flash memory.

4. The method of claim 1, wherein access latency to the non-volatile cache is shorter than access latency to the non-volatile storage device.

5. The method of claim 1, the mapping table having at least one entry each for a block of data, each entry including:
   start logical block address (LBA) of the data block on the non-volatile storage device ("disk LBA");
   size of the data block in sectors ("data size"); and
   mapped address on the non-volatile cache for the disk LBA ("cache LBA").

6. The method of claim 5, wherein writing the block of data included in the disk write to the non-volatile cache comprises:
   determining if the disk write is the first write of the memory image;
   if it is, initializing the mapping table; and
   creating the first entry in the mapping table.

7. The method of claim 1, wherein writing the block of data included in the disk write to the non-volatile cache further comprises calculating a cache LBA for the block of data and storing the cache LBA in the mapping table entry for the block of data.

8. The method of claim 5, further comprising:
   sorting the at least one entry in the mapping table by disk LBA, after the last disk write of the memory image is written to the non-volatile cache; and
   writing the sorted mapping table to the non-volatile cache.

9. The method of claim 1, further comprising:
   identifying that the disk write overlaps with a previous disk write for the transition to the low power state; and in response to the identifying,
    modifying a mapping table entry that represents the previous disk write, and
    creating a new mapping table entry for the disk write.

10. The method of claim 1, further comprising writing the block of data to the non-volatile storage device.

11. An apparatus for caching memory content to facilitate instant-on resuming from a low power state for a computing system, comprising:
    a main memory;
    a non-volatile storage device coupled to the main memory;
    a non-volatile cache to cache content in the main memory that is to be written to the non-volatile storage device when the computing system is entering the low power state, and to provide data requested from the non-volatile storage device for the main memory when the computing system resumes from the low power state, wherein the non-volatile cache includes a mapping table that correlates addresses of the same data on the non-volatile device and on the non-volatile cache; and
    means for directing a write to the non-volatile storage device ("disk write") to the non-volatile cache, including
        means for determining that data included in the disk write is contiguous with data included in a disk write for the transition to the low power state that immediately precedes the disk write ("previous disk write"), wherein the data included in the previous disk write corresponds to an already existing entry of the mapping table, and
        means, responsive to the means for determining, for merging the block of data with the data in the previous disk write to form a larger block of data on the non-volatile cache, and
        means, responsive to the means for determining, for modifying the already existing entry of the mapping table to describe a size of the larger block of data.

12. The apparatus of claim 11, wherein access latency to the non-volatile cache is shorter than access latency to the non-volatile storage device.

13. The apparatus of claim 11, wherein the low power state comprises a hibernation state, the hibernation state including an S4 state under the Advanced Configuration and Power Interface (ACPI) specification.

14. The apparatus of claim 11, wherein the non-volatile storage device comprises a secondary storage device, the secondary storage device including a hard disk drive; and the non-volatile cache comprises flash memory.

15. The apparatus of claim 11, wherein the means for directing writes to the non-volatile storage device to the non-volatile cache directs a write if there is enough room available in the non-volatile cache.

16. The apparatus of claim 15, wherein power for the main memory is turned off after all required content in the main memory has been written to at least one of the non-volatile storage device or the non-volatile cache.

17. The apparatus of claim 11, wherein the non-volatile cache is coupled to a bus that connects the non-volatile storage device and a controller corresponding to the non-volatile storage device.

18. The apparatus of claim 11, wherein the mapping table comprises at least one entry each for a block of data, each entry including:
    start logical block address (LBA) of the data block on the non-volatile storage device ("disk LBA");
    size of the data block in sectors ("data size"); and
    mapped address on the non-volatile cache for the disk LBA ("cache LBA").

19. An article comprising a machine-readable storage medium having stored thereon instructions, which when executed by a processing platform, cause said processing platform to perform operations including:
    receiving a request to write memory content to a non-volatile storage device for a transition of a computing system to a low power state;
    generating an image for the memory content;
    sending the memory image to the non-volatile storage device in at least one write ("disk write"), each write including a block of data, size of the block of data, and logical block address (LBA) of the block of data on the non-volatile storage device ("disk LBA");
    intercepting the disk write;
    directing the disk write to a non-volatile cache;
    writing the block of data included in the disk write to the non-volatile cache, including
        determining that the block of data included in the disk write is contiguous with data included in a disk write for the transition to the low power state that immediately precedes the disk write ("previous disk write"), wherein the data included in the previous disk write corresponds to an already existing entry of a mapping table correlating data in the non-volatile cache to data to be written to the non-volatile storage device, and
        in response to the determining,
            merging the block of data with the data in the previous disk write to form a larger block of data on the non-volatile cache, and
            modifying the already existing entry of the mapping table to describe a size of the larger block of data.

20. The article of claim 19, the mapping table having at least one entry each for a block of data, each entry including:
    start logical block address (LBA) of the data block on the non-volatile storage device ("disk LBA");
    size of the data block in sectors ("data size"); and
    mapped address on the non-volatile cache for the disk LBA ("cache LBA").

21. The article of claim 20, wherein writing the block of data included in the disk write to the non-volatile cache comprises:
    determining if the disk write is the first write of the memory image;
    if it is, initializing the mapping table; and
    creating the first entry in the mapping table.

22. The article of claim 19, wherein writing the block of data included in the disk write to the non-volatile cache further comprises calculating a cache LBA for the block of data and storing the cache LBA in the mapping table entry for the block of data.

23. The article of claim 20, wherein the operations further comprises:
    sorting the at least one entry in the mapping table by disk LBA, after the last disk write of the memory image is written to the non-volatile cache; and
    writing the sorted mapping table to the non-volatile cache.

24. The article of claim 19, wherein the operations further comprises:
    identifying that the disk write overlaps with a previous disk write for the transition to the low power state; and
    in response to the identifying,
        modifying a mapping table entry that represents the previous disk write, and
        creating a new mapping table entry for the disk write.

25. The article of claim 19, wherein the operations further comprises writing the block of data to the non-volatile storage device.

* * * * *